Dec. 27, 1960     H. V. SMITH     2,966,172
OVERLAPPING VALVE ASSEMBLY
Filed July 10, 1957     2 Sheets-Sheet 1
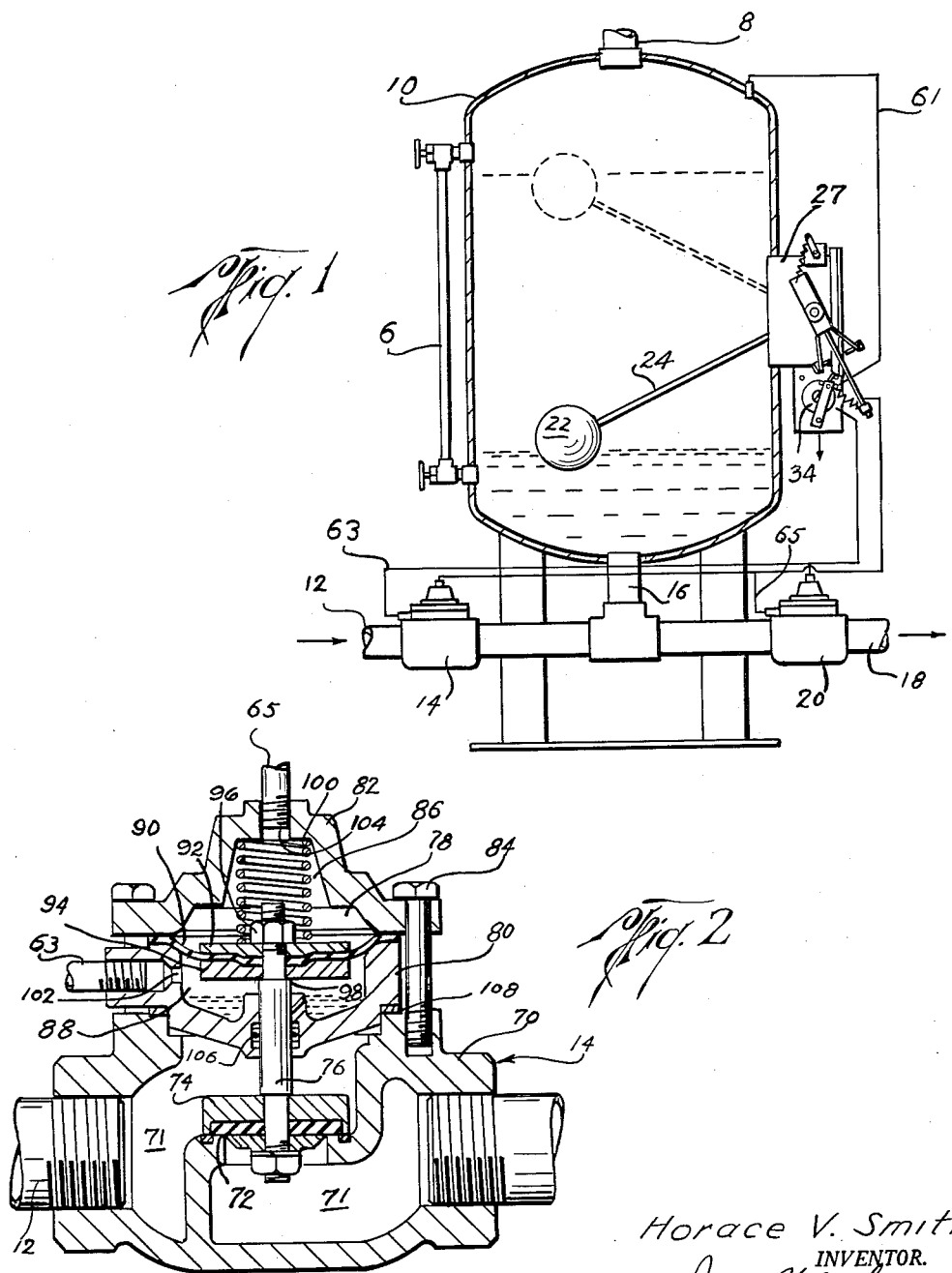
Horace V. Smith
INVENTOR.
BY
ATTORNEYS

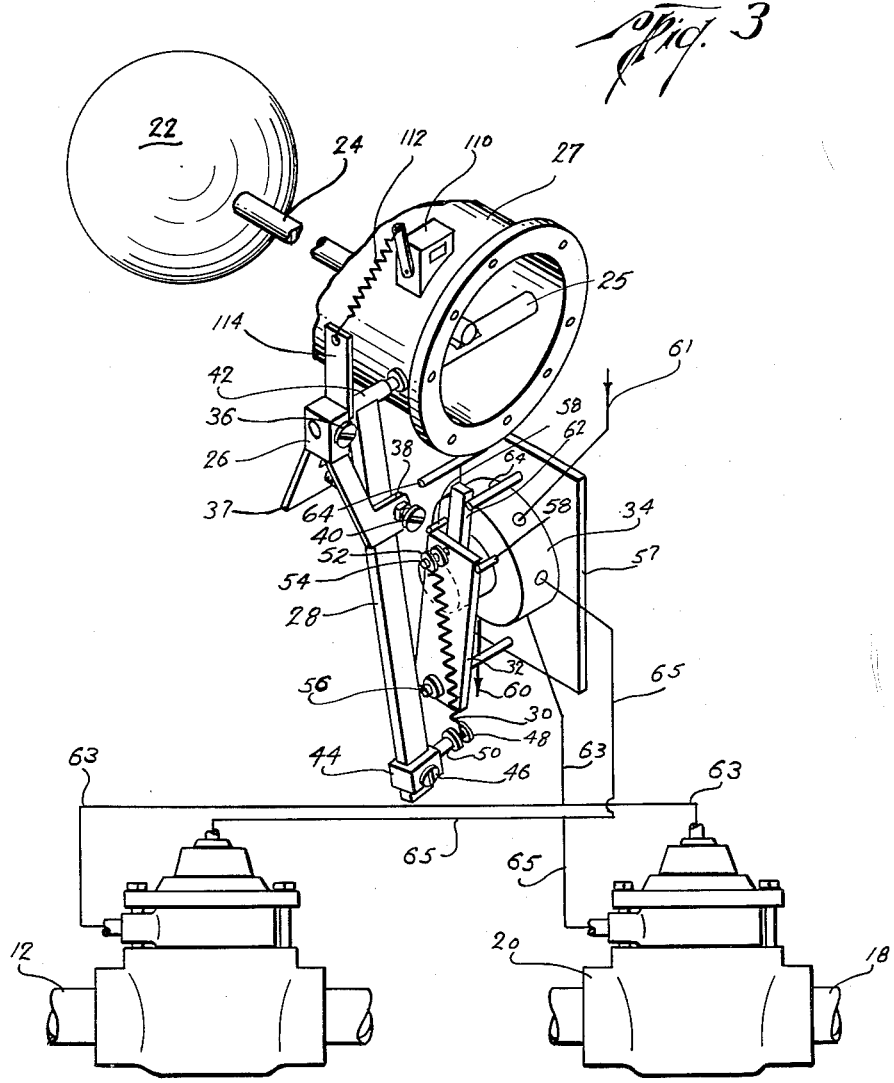

United States Patent Office

2,966,172
Patented Dec. 27, 1960

2,966,172

OVERLAPPING VALVE ASSEMBLY

Horace V. Smith, Houston, Tex., assignor to Oil Metering and Processing Equipment Corp, Houston, Tex., a corporation of Texas Filed July 10, 1957, Ser. No. 670,947

4 Claims. (Cl. 137—627.5)

The present invention relates to an overlapping valve assembly and more particularly relates to one in which a snap acting pilot mechanism is combined with two 2-way pressure responsive valve elements so that when said valve elements are oppositely actuated the closing valve element closes before the opening valve element opens.

In the metering of liquids, especially of oil and water from oil and gas wells or gathering systems, there are various metering devices used in which a metering vessel is alternately filled and emptied with the liquid being metered with each cycle of filling and emptying being counted thereby metering the amount of liquid passing through the metering vessel. The liquid passing into and out of the metering vessel passes through inlet and outlet valve elements with the inlet valve element being open and the outlet valve element being closed during filling of the metering chamber, and the outlet valve element being open and the inlet valve being closed during draining of the vessel. In operation it would be ideal if the inlet and outlet valves or valve elements would act oppositely at exactly the same instant but this has not been successfully achieved and quite often the opening valve will open before the closing valve completely closes thereby resulting in a certain flow of unmetered liquid through the metering device. This is particularly true where large volumes of rapidly flowing liquid are being measured such as in conjunction with the metering of oil and water from oil and gas wells or gathering systems. Because of the value of such liquids this inaccurate metering is highly undesirable.

It is therefore a general purpose of the present invention to provide an overlapping valve assembly in which the closing valve closes before the opening valve opens thereby preventing the escape of unmetered liquid.

Another object of the present invention is to provide such an assembly in which the delay in the opening of the opening valve after the closing of the closing valve is so small in time that flow of liquid into and out of the metering vessel is not appreciably interrupted.

A still further object is to provide such an assembly including valve elements that are positive in their seating.

Another object of the present invention is to provide such an assembly including two 2-way pressure responsive valves each having a valve opening and a valve closing chamber so constructed and arranged that the application of fluid pressure to each valve opening chamber opens the valve and exhausts fluid pressure from the valve closing chamber and each valve includes spring means assisting the closing of said valve.

A still further object of the present invention is to provide such an assembly in which the valves are supplied with fluid pressure from a common source.

Yet a further object of the present invention is the provision of such an overlapping valve assembly which is relatively inexpensive to manufacture, maintain and repair, and is dependable in operation.

Other and further objects, features, and advantages will be apparent from the following description of the presently preferred example of the present invention, given for the purpose of disclosure and taken in conjunction with the accompanying drawings, where like character references designate like parts throughout the several views and where:

Figure 1 is a side elevation illustrating the overlapping valve assembly of the present invention, as part of a metering device, Figure 2 is an enlarged side elevation of the preferred form of overlapping valve, and Figure 3 is a fragmentary perspective view, partly diagrammatic, illustrating the overlapping valve assembly of the present invention.

Referring now to the drawings, and particularly to Figure 1, a metering vessel 10 is provided to receive measured quantities of liquid flowing therethrough. A gas equalizing connection 8 keeps pressure in the filling vessel 10 from reducing the rate of filling and a conventional sight gauge 6 indicates the liquid level in the vessel 10. A liquid inlet line 12 controlled by the inlet valve 14 is connected to the flow line 16 extending into the metering vessel 10 at its lower portion. Similarly, a liquid outflow line 18 controlled by the outlet valve 20 is connected to the flow line 16. Thus, upon alternate actuation of the valves 14 and 20 liquid, such as oil, water or mixtures thereof, fills and drains from the metering vessel 10. Disposed within the metering vessel 10 is a float 22 rigidly connected to an arm 24.

This metering vessel 10 and the float 22 with its float shaft 24 are conventional and are not part of the present invention except to illustrate one method of its use.

The preferred form of snap acting pilot means is illustrated in Figure 3 and includes as a whole the control member or rock shaft 25 mounted for oscillating rotatable movement such as through a tubular nozzle 27 opening into the metering vessel 10; an adjustable engaging member 26 secured on an end of the rock shaft 25 extending from the nozzle 27; a swing arm 28 pivotly mounted on the rock arm 25 for independent rotation therewith; and resilient tension linkage 30 secured to the swing arm 28 and to a pivot arm 32 actuating a 4-way pilot valve 34.

The rock shaft 25 is pivotly mounted in any conventional way and is oscillatably rotated by movement of the float 22 on the float arm 24 which is rigidly secured to the rock shaft 25. Thus, in this example, as the float 22 rises and falls with changes of liquid level the float arm 24 causes an oscillating rotation of the rock shaft 25.

The engaging member 26 is adjustably secured, such as by a set screw 36, to the end of the rock shaft 25 extending from the nozzle 27 for rotation therewith and includes a generally U-shaped bracket formed of a pair of generally L-shaped brackets 37. Disposed in the free end 38 of each L-shaped bracket 37 is a contact screw 40 by which suitable adjustment may be made for calibrating the snap acting pilot mechanism as will be presently described.

Rotatably secured at its upper end, such as by the journal bearing 42, and passing between the L-shaped brackets 37 is the downwardly extending swing arm 28 on the lower end of which is a slideable sleeve 44 which may be secured in any position along the arm 28 by means of the adjusting screw 46. A rotatable sleeve 48 to help reduce friction is secured on a pin 50 secured to and extending from the slideable sleeve 44. One end of resilient tension linkage such as a tension spring 30 is secured in a groove on this rotatable sleeve 48 and the upper end is secured in a similar grooved rotatable sleeve 52 attached to a pin 54 extending from the pivot arm 32. The pivot arm 32 is pivotly mounted such as by the shaft 56 in a plate 57 holding the pilot valve 34. Secured to and projecting from the upper end of the pivot arm 32 is a pair of spaced projections 58 forming contact members that straddle the pilot actuating arm 62 of the pilot valve 34 and strike the pilot actuating arm 62 when the pivot arm 32 is moved from side to side thereby moving the pilot actuating arm 62 and actuating the pilot valve 34. The pilot valve 34 here illustrated is connected to a gas supply line 61 from the top of the metering vessel 10 (Figure 1) which supplies pressure to the pilot valve 34 with pressure being selectively directed from said pilot valve 34 through the first and second pressure lines 63 and 65 respectively by the movement of the pilot actuating arm 62. In operation, a conventional exhaust port 60 permits back pressure to drain from the pressure line 63 or 65 not then being supplied with fluid pressure.

It is to be noted that the tension spring 30 is connected to the swing arm 28 on one side of the shaft 56 forming the pivot point of the pivot arm 32 and connected to the pivot arm 32 on the other side of the shaft or pivot point 56. Thus, the tension of the spring 30 tends to hold the pivot arm 32 on whatever side of the shaft 56 the lower end of the spring 30 is at that time.

To prevent the pivot arm 32 from damaging the pilot valve 34 when the pilot actuating arm 62 is thrown from side to side by the projections 58, a pair of stops 64 extend outwardly from the plate 57 on each side of the pilot actuating arm 62. These stops 64 are spaced so that the pilot actuating arm 62 has sufficient movement to operate the pilot valve 34, but are placed close enough together to prevent damage to the pilot valve 34.

In operation of this particular snap acting pilot means, the rock shaft 25 is oscillatably rotated such as by means of a vertical swinging movement of the float 22 and a corresponding movement is transmitted to the L-shaped brackets 37. This causes alternate inner ends of the contact screws 40, after predetermined movement, to contact the swing arm 28 and swing it first in one direction and then in the other in response to the movement of the float 22 as described. As the swing arm 28 moves from one side to the other tension on the spring 30, when it passes the straight line through the shaft 56 and the pin 54, snaps the pivot arm 32 from one extreme position to the other. As the pivot arm 32 is oscillated on its shaft 56 the projections 58 strike the pilot actuating arm 62 actuating the pilot valve 34.

It will be noted that the projections 58 are spaced farther apart than the width of the pilot actuating arm 62 so that only one of such projections 58 is in contact with the pilot actuating arm 62 at any one time and there is a space between the pilot actuating arm 62 and the other projection 58. Further as the pivot arm 32 contacts the pilot actuating arm 62 only by the projections 58, if there should be any creeping of the pivot arm 32 before the spring 30 passes the shaft 56 such motion is not transmitted to the pilot actuating arm 62 because the particular projection 58 which will strike the pilot actuating arm 62 is spaced from it. This lost motion between the pivot arm 32 and the pilot actuating arm 62 in the event there should be any creeping of the pivot arm 32, together with the action of the spring 30, prevents any "creeping" of the pilot valve 34 and the pilot valve 34 is snap acted by the striking of one of the projections 58 when the tension on the spring 30 finally snaps the pivot arm 32.

Varying the distance between the inner ends of the contact screws 40 and the swing arm 28 calibrates the snap acting pilot mechanism by varying the angular rotation of the rock shaft 25 necessary to cause contact between the engaging member 26 and the swing arm 28. Also, adjustment of the slideable sleeve 44 along the swing arm 28 adjusts the tension on the spring 30.

This snap acting mechanism other than the pilot valve is claimed in Patent No. 2,818,738 granted January 7, 1958, to H. V. Smith et al. for Snap Acting Mechanism. The pilot valve 34 may be of any preferred type of 4-way valve with an exhaust of which several are readily available on the market such as Pilot Valve Model CFI-CI manufactured by the Clayton Valve Company (Cla-Val) of Newport Beach, California. Accordingly, no detailed description of such valve is necessary. Any snap acting pilot mechanism is satisfactory if in one position it simultaneously directs pressure to the pressure line 63 and drains it from the pressure line 65 and in a second position simultaneously directs pressure to the pressure line 65 and drains it from the pressure line 63 and further if this change of positions is done without any "creeping" of the pilot valve which would cause pressure from pressure line 61 to have access to both pressure lines 63 and 65 simultaneously.

Referring now to Figure 2 there is illustrated in detail the inlet valve 14 which is identical to the outlet valve 20. In operation the inlet and outlet valves 14 and 20 may be used with the direction of flow through such valves either from left to right as illustrated in Figure 2 or from right to left as desired. The inlet valve 14 includes a lower housing 70 having therein a conventional fluid chamber 71 containing an annular valve seat 72 through the center of which valve seat 72 liquid flows except when the valve seat is sealed by a conventional valve disc 74 operated by a reciprocating movement of a valve stem 76. Above the fluid chamber 71 is a fluid tight compartment 78 formed by an upper housing 80 and a bonnet 82 with the bonnet 82 and the upper housing 80 held together and against the lower housing 70 by the bolts 84. The fluid tight compartment 78 is divided into an upper or valve closing chamber 86 and a lower or valve opening chamber 88 by the imperforate flexible diaphragm 90 secured at its periphery between the bonnet 82 and upper housing 80.

A valve stem 76 slidably extends through the lower part of upper housing 80 and is secured at its upper end to the diaphragm 90 by compressing a diaphragm upper plate 92 on the upper side of the diaphragm 90 and a diaphragm lower plate 94 on the lower side of the diaphragm 90 between a nut 96 on the valve stem 76 above the diaphragm upper plate 92 and a shoulder 98 on the valve stem 76 below the diaphragm lower plate 94.

Spring means to urge the valve into the closed position illustrated in Figure 2 is provided which in the preferred form of valve is the compression spring 100 acting between the upper plate 92 and the bonnet 82. A port 102 provides fluid communication between the pressure line 63 and the lower or valve opening chamber 88 and a port 104 provides fluid communication between the pressure line 65 and the upper or valve closing chamber 86.

Conventional sealing means such as an O-ring 106 may be provided around the valve stem 76 and a gasket 108 may be provided between the upper housing 80 and lower housing 70 to prevent the escape of liquid from the fluid chamber 71. If desired, the lower portion of the lower chamber 88 may contain liquid, such as oil, to lubricate the O-ring 106.

Referring now to Figure 3 it can be seen that the pressure line 63 is connected to the valve opening chamber 88 of the inlet valve 14 and to the valve closing chamber of the outlet valve 20 while the pressure line 65 is connected to the valve closing chamber 86 of the inlet valve 14 and to the valve opening chamber of the outlet valve 20. Thus, when the pressure is applied to the pressure line 63 and allowed to drain from the pressure line 65 the pressure in line 63 will be applied to the lower side of the diaphragm 90 in the inlet valve 14 opening said valve and will be applied to the upper side of the diaphragm in the outlet valve 20 closing said valve with the pressure on the opposite side of the diaphragms in each valve being drained out the pressure line 65. The pressure being applied to the valve opening chamber 88 of the inlet valve 14 must overcome the compressive force of the compression spring 100 while the closing of the outlet valve 20 is aided by its compression spring, thereby causing the outlet valve 20 to close shortly before the inlet valve 14 opens. Actuation of the pilot valve 34 to reverse the direction of flow in the pressure lines 63 and 65 reverses this operation of the valves 14 and 20.

In operation, assuming the position shown in Figure 1 illustrates a metering device at the instant the float 22 in the metering vessel 10 reaches its lowest level the left L-shaped bracket 37 will bear against the swing arm 28 moving it to the right snapping the pivot arm 32 to the right as previously described which in turn snaps the pilot actuating arm 62 to the right opening the pressure line 63 to pressure from pressure line 61 and opening the pressure line 65 to the exhaust 60. When this occurs the pressure applied to the valve closing chamber of the outlet valve 20 together with the force of its compression spring closes the outlet valve 20 exhausting pressure in the valve opening chamber out the pressure line 65 and at the same time pressure is applied through this line 63 to the valve opening chamber 88 of the inlet valve 14 which opens said inlet valve 14 forcing pressure in its valve closing chamber 86 out the pressure line 65. Because the pressure applied to the inlet and outlet valves 14 and 20 is identical and because the closing of the outlet valve 20 is assisted by the force of its compression spring while the force of the spring 100 in the inlet valve 14 must be overcome the outlet valve 20 closes before the inlet valve 14 opens thereby preventing any unmetered liquid from leaving the metering device.

Liquid continues to enter the metering vessel 10 through the open inlet valve 14, the outlet valve 20 being closed, until the float 22 reaches the dotted position shown in Figure 1 whereupon the snap acting pilot mechanism will be activated to reverse the direction of flow of pressure in the pressure lines 63 and 65 causing the inlet valve 14 to close and then the outlet valve 20 to open. Because both gas pressure and spring force are tending to close the inlet valve 14 while the gas pressure in the outlet valve 20 is overcoming spring force, the inlet valve 14 will close before the outlet valve 20 will open again preventing any unmetered liquid from passing through the metering device.

As best seen in Figure 3, each time the rock shaft 25 is oscillated by the float 22 a counter 110 is actuated by the spring 112 connected to an arm 114 secured to the rock shaft 25 thus keeping a count of each time the metering vessel 10 fills and empties.

It has been found that in use with liquid metering devices of the type illustrated in Figure 1 the time of overlapping of the valves, that is the time during which the closing valve is closed before opening valve is opened, is usually around 3/10 of a second which overlapping gives extreme accuracy in metering but is so slight in time that there is no practical interruption of the emptying and filling of the metering vessel 10.

While the present invention has been described in connection with metering in a particular arrangement of metering device it will be understood that the invention may be used in other devices and that other snap acting pilot means than those illustrated may be used. In addition, certain rearrangements of parts and substitution of parts will readily suggest themselves to those skilled in the art which are encompassed within the spirit of the invention and the scope of the appended claims.

The present invention therefore is well suited to carry out the objects and attain the advantages and ends mentioned as well as others inherent therein. Accordingly, the invention is to be limited only by the spirit thereof and the scope of the appended claims.

What is claimed is:
1. In combination, first and second pressure responsive 2-way valve elements, each said valve element having a valve opening and a valve closing chamber so constructed and arranged that application of fluid pressure to the valve opening chamber opens the valve element and exhausts fluid pressure from the valve closing chamber and application of fluid pressure to the valve closing chamber closes the valve element and exhausts pressure from the valve opening chamber, each said valve element including spring means assisting the closing of said valve; a first pressure line connected to the valve opening chamber of the first valve element and the valve closing chamber of the second valve element; a second pressure line connected to the valve opening chamber of the second valve element and the valve closing chamber of the first valve element; and snap acting pilot means connected to said first and second pressure lines, said snap acting pilot means adapted in a first position to simultaneously direct pressure to the first pressure line and drain it from the second pressure line and in a second position to simultaneously direct pressure to the second pressure line and drain it from the first pressure line whereby such valve elements are alternately opened and closed with said closing of a valve element preceding the opening of the other valve element.

2. The combination of claim 1 in which the valve opening chamber and the valve closing chamber in each valve element are separated by a member movable in response to fluid pressure differentials on each side of said movable member and in which said valve elements are opened and closed by movement of said movable member.

3. The combination of claim 2 in which the movable member is a flexible diaphragm.

4. In combination, first and second pressure responsive 2-way valves each said valve having a flow passage opened and closed by reciprocating movement of a valve member one end of which valve member slideably extends into a fluid tight compartment, a flexible diaphragm in said compartment secured to said end of the valve member and dividing said compartment into first and second fluid tight chambers, spring means in said valve normally urging the valve stem in a direction closing the valve, a fluid passage between the exterior of the valve and the first chamber, and another fluid passage in each valve between the exterior of the valve and the second chamber, a first pressure line connected to the first chamber of the first valve and the second chamber of the second valve; a second pressure line connected to the first chamber of the second valve and the second chamber of the first valve; and snap acting pilot means connected to said first and second pressure lines said snap acting pilot means adapted in a first position to simultaneously direct pressure to the first pressure line and drain it from the second pressure line and in a second position to simultaneously direct pressure to the second pressure line and drain it from the first pressure line whereby such valves are alternately opened and closed with said closing of one valve preceding the opening of the other valve.

References Cited in the file of this patent
UNITED STATES PATENTS

| | | |
|---|---|---|
| 607,265 | McLean | July 12, 1898 |
| 1,455,211 | Kelly | May 15, 1923 |
| 1,839,807 | Shafer | Jan. 5, 1932 |
| 2,610,649 | Brodhun | Sept. 16, 1952 |
| 2,794,342 | Franklin | June 4, 1957 |

FOREIGN PATENTS

| | | |
|---|---|---|
| 392,589 | Germany | Mar. 24, 1924 |